(12) United States Patent
Hanton et al.

(10) Patent No.: US 11,509,864 B1
(45) Date of Patent: Nov. 22, 2022

(54) PRE-COMPOSING GRAPHICAL ELEMENTS FOR USE BY A SEPARATE REAL-TIME MEDIA PROCESS

(71) Applicant: Cisco Technology, Inc., San Jose, CA (US)

(72) Inventors: Robert Armstrong Hanton, Rickmansworth (GB); Gordon Robert Parke, Egham (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/308,371

(22) Filed: May 5, 2021

(51) Int. Cl.
H04N 7/15 (2006.01)
G06T 5/50 (2006.01)

(52) U.S. Cl.
CPC ............... H04N 7/152 (2013.01); G06T 5/50 (2013.01); G06T 2207/20221 (2013.01)

(58) Field of Classification Search
CPC .................................... H04N 7/15; G06T 5/50
USPC ............................................ 348/14.01–14.16
See application file for complete search history.

(56) References Cited

U.S. PATENT DOCUMENTS

| 11,196,963 | B1* | 12/2021 | DiPasquale | ........... H04L 65/403 |
| 2010/0333004 | A1 | 12/2010 | Kristiansen et al. | |
| 2013/0027502 | A1 | 1/2013 | Skramstad | |
| 2013/0093835 | A1* | 4/2013 | Paithankar | ............. H04N 7/152 348/E7.083 |
| 2013/0194378 | A1 | 8/2013 | Brown | |
| 2014/0009562 | A1 | 1/2014 | Hegde et al. | |
| 2015/0097915 | A1* | 4/2015 | Navon | ................... H04N 7/152 348/14.1 |
| 2017/0201719 | A1 | 7/2017 | Choi et al. | |

* cited by examiner

Primary Examiner — Melur Ramakrishnaiah
(74) Attorney, Agent, or Firm — Edell, Shapiro & Finnan, LLC

(57) ABSTRACT

A method for arranging a layout for a videoconference includes defining a first size, a first location, and a z-axis position of a first video pane in the layout for the videoconference, adding a first graphic object to the layout at a second z-axis position, adding a first text object to the layout at a third z-axis position, merging the first graphic object and the first text object into a merged graphic object having a fourth z-axis position, and sending information representative of the first size, the first location, and the z-axis position of the first video pane, and the merged graphic object and the fourth z-axis position of the merged graphic object to a playback service. Thus, e.g., the playback service need not have access to the fonts used for the text object and need only render a limited number of overall graphic objects.

20 Claims, 7 Drawing Sheets

PRE-COMPOSING GRAPHICAL ELEMENTS FOR USE BY A SEPARATE REAL-TIME MEDIA PROCESS

TECHNICAL FIELD

The present disclosure relates to customizable layouts for video conferencing and streaming.

BACKGROUND

Conventional videoconferencing systems comprise a number of end-points that exchange real-time video, audio and/or data streams among themselves over various networks such as a Wide Area Network (WAN), a Local Area Network (LAN) and/or a circuit switched network.

A number of audiovisual terminals disposed at the different end-point sites may participate in the same conference, most often, through one or more Multipoint Control Units (MCUs) performing, e.g., switching and mixing functions to allow the audiovisual terminals to communicate properly with one another in a videoconference context. The MCU may be part of a playback service (or media service) that might also execute a real-time composition engine that renders and composes received video that is then distributed via the MCU to the different sites.

The MCU may be a standalone device operating as a central network resource, or it could be integrated in a codec of a video conferencing system. The MCU links the sites together by receiving frames of conference signals from the end-point sites, processes the received signals, and retransmits the processed signals to appropriate sites.

In a continuous presence conference, video signals and/or data signals from two or more end-point sites are spatially mixed to form a composite video signal for viewing by conference participants. The composite video signal is a combined video signal that may include live video streams, still images, menus or other visual images from participants in the conference. There are innumerable possibilities regarding how the different video and/or data signals may be spatially mixed, e.g., size and position of the different video panes and data frames in the composite image. A codec and/or MCU typically has a set of preconfigured composite layout templates stored on the MCU or video conference codec allocating one or more regions within a composite video signal for one or more video and/or data streams received by the MCU or codec.

DESCRIPTION OF EXAMPLE EMBODIMENTS

Overview

Presented herein is a method for arranging a layout for a videoconference including defining a first size, a first location, and a z-axis position of a first video pane in the layout for the videoconference, adding a first graphic object to the layout at a second z-axis position, adding a first text object to the layout at a third z-axis position, merging the first graphic object and the first text object into a merged graphic object having fourth z-axis position, and sending information representative of the first size, the first location, and the z-axis position of the first video pane, and the merged graphic object and the fourth z-axis position of the merged graphic object to a playback service.

In another embodiment, a device is provided. The device includes an interface configured to enable network communications, a memory, and one or more processors coupled to the interface and the memory, and configured to: define a first size, a first location, and a z-axis position of a first video pane in a layout for a videoconference, add a first graphic object to the layout at a second z-axis position, add a first text object to the layout at a third z-axis position, merge the first graphic object and the first text object into a merged graphic object having fourth z-axis position, and send information representative of the first size, the first location, and the z-axis position of the first video pane, and the merged graphic object and the fourth z-axis position of the merged graphic object to a playback service.

Example Embodiments

Embodiments described herein enable a user, namely a host, producer, coordinator, etc. (hereafter "host"), of a video conferencing meeting and/or streaming service to produce customizable layouts, including, e.g., what the final composed video experience will be, where video panes will appear and who/what will appear in it, along with any number of custom graphic elements and text fields including custom fonts.

Such customization of a layout presents a challenge for real-time composition engines, which are usually optimized for scale and efficiency. The videoconference host expects the resulting user experience to precisely match their design, but performing the necessary rendering of customizable graphical elements within the composition engine might require it to support sub-pixel accuracy, to upload and use arbitrary fonts, and to have sufficient memory to support a very high or arbitrary number of graphical elements. The end result may be a customer experience that does not precisely match what was designed, i.e., has limitations in terms of font use, the number of graphical elements, etc.

Figure 1:
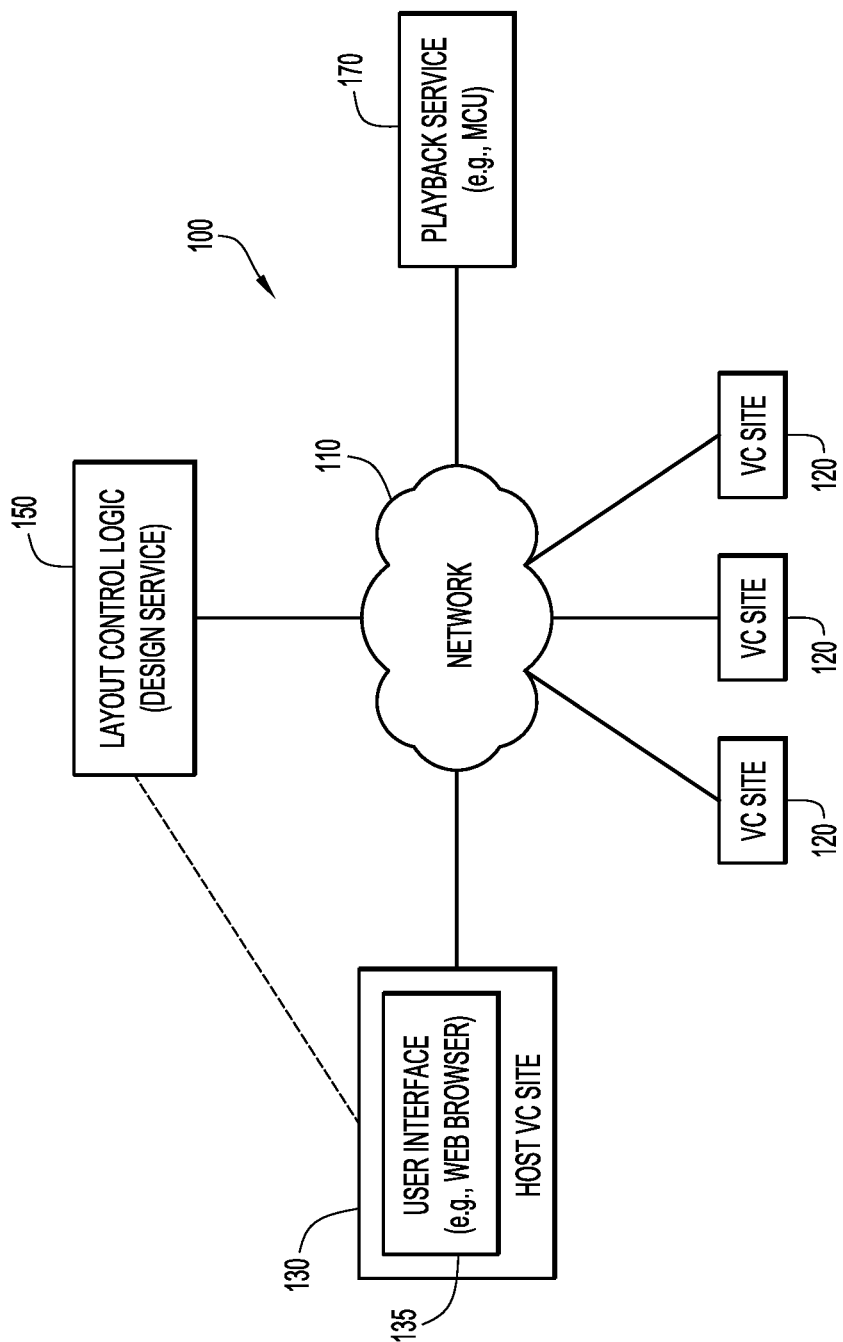
FIG. 1 shows a system, including layout control logic, for providing customizable layouts for a videoconference, according to an example embodiment.

The embodiments described herein overcome this challenge, especially in a system in which the design service and playback service are separate from one another. In this regard, reference is now made to FIG. 1, which shows a system, including layout control logic 150, for providing customizable layouts for a videoconference, according to an example embodiment. More specifically, system 100 includes a network 110, videoconference (VC) sites 120, a host VC site 130 including a user interface 135, layout control logic 150, and a playback service 170.

Network 110 may be the Internet, or any other public or private network such as a WAN or LAN. VC sites 120 may be individual electronic devices including, but not limited to, a computer, tablet, mobile phone, etc., and configured, via appropriate application software (such as a WebEx video-conference application client, available from Cisco Systems, Inc., San Jose, Calif.), to participate in a videoconference.

Host VC site 130 may be similar to any VC site 120, but may also include user interface 135, via which a host may customize the layout of a video conference using layout control logic 150. Layout control logic 150 may be a "design service" accessible via a web browser (e.g., the user interface 135) and be accessible via the network 110, or may be executable directly at host VC site 130 (as suggested by the dashed line connecting host VC site 130 and layout control logic 150.

Playback service 170 may be implemented by a server and may host an MCU and composing functionality. More specifically, playback service 170, may be a proprietary software or hardware video system, a multipoint conferencing engine configured to compose videoconference meeting audio and video into a single audio/video stream for consumption by any third-party video endpoint (e.g., VC site 120), or a composition service that uploads a stream via a protocol such as Real-Time Messaging Protocol (RTMP) for consumption by users of services like Facebook Live or Twitch.

In operation, and as will be explained in more detail below, a host customizes a layout for a given videoconference using user interface 135 and layout control logic 150. The customized layout may include custom images and text that are merged (with text being rasterized) into a merged image or merged images (such as a background image and/or a foreground image) along with metadata that specifies where in the layout video panes are to be located. Host VC site 130 then sends the merged image or merged images and metadata to the playback service for composing and distribution to VC sites 120.

Layout control logic 150, operating as a design service, (via, a web browser, via user interface 135) enables a host to define the size and position of video panes, upload and size/position images, and use any font to define text strings of any size/position, as well as select a z-ordering of these elements. In one implementation, layout control logic 150 is configured to permit image/text graphics to appear between video panes on the z-axis, or may only allow them to be in the foreground (above all panes) or background (below all panes). Layout control logic 150 may be further configured to enable the host to save their work, in which case all uploaded images, fonts and metadata may be saved either locally at host VC site 130 or on a cloud service, including, for example, memory associated with a server that executes layout control logic 150, for later retrieval (see, e.g., the discussion of FIG. 7 below).

Figure 2:
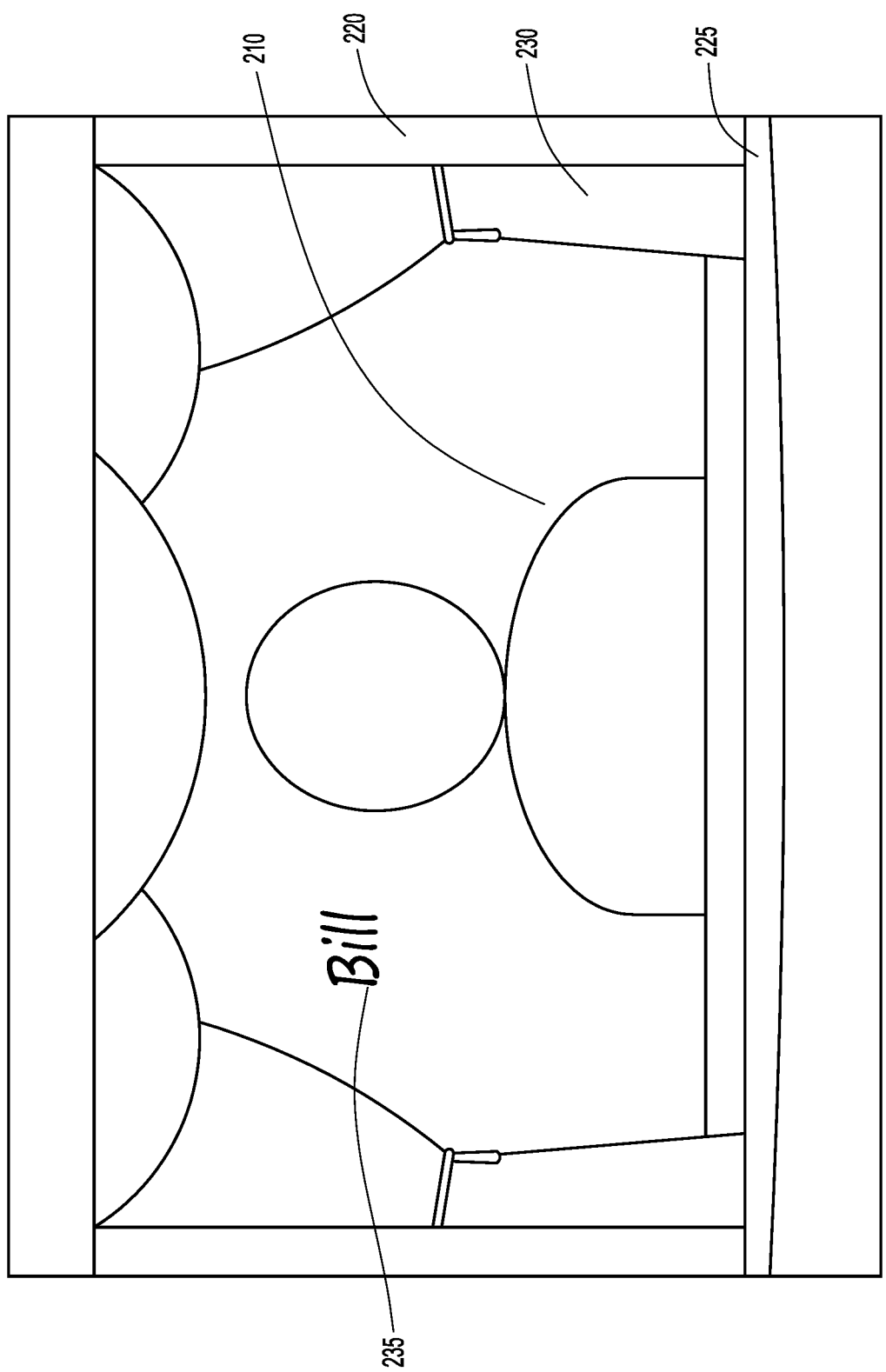
FIGS. 2 and 3 show possible customized layouts defined by layout control logic, according to an example embodiment.
Figure 3:
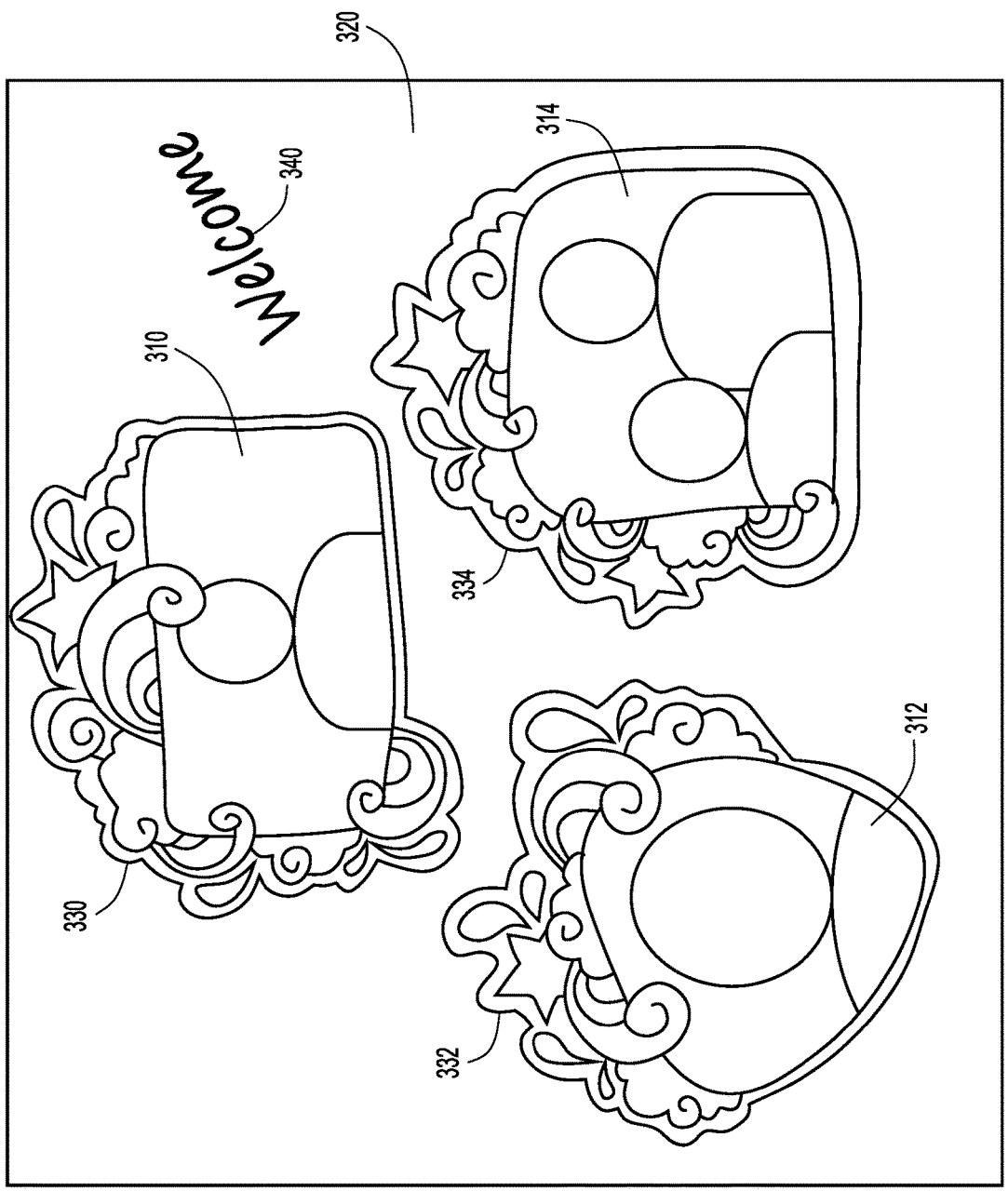

FIGS. 2 and 3 show possible customized layouts defined by layout control logic 150, according to an example embodiment. The layout of FIG. 2, which may be developed via user interface 135 in concert with layout control logic 150, includes a single video pane 210 which fills the entire screen, and a single foreground image 220, which initially comprised three separate image or text elements including stage 225, curtains 230, and text 235 that are combined or merged by layout control logic into a single foreground image 220. Metadata about the single video pane 210 and the single foreground image 220 are then sent to, and rendered by, the playback service 170. The layout of FIG. 2 is rather simple, with only a single video pane 210 and a single foreground image 220.

A more complicated layout is depicted in FIG. 3. That figure show three video panes 310, 312, 314, over a background image 320 (in this case being a single color background), and foreground objects including three images 330, 332, 334, and text 340. These latter elements are arranged above the video panes 310, 312, 314, thus placing those elements in the foreground.

In both the case of FIG. 2 and the case of FIG. 3, layout control logic 150, before providing the layout to playback service 170, automatically merges all text and graphical objects with adjacent text or graphical objects, rasterizing the text objects in the process to, e.g., one or more graphical objects, which, in one possible implementation, support transparency. For example, layout control logic 150 may be configured to generate a portable network graphic (PNG) file based on the text and graphical objects. Multiple individual merged files may thus be provided to playback service 170 to build up or compose the final composite image and/or video.

Figure 4:
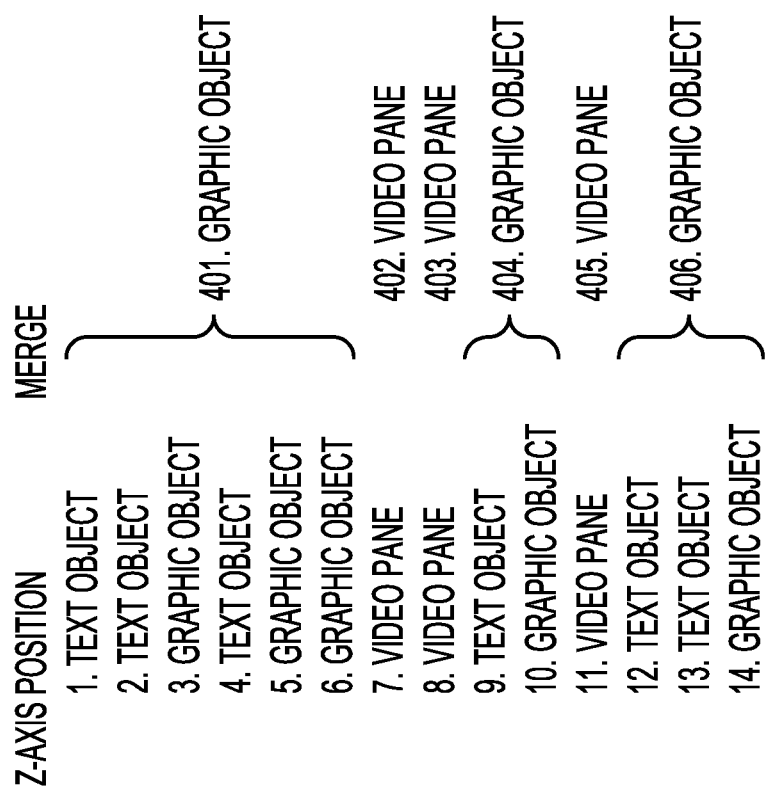
FIG. 4 shows an example of various text objects and graphical objects that are merged to create one or more graphical objects that are provided to a playback service, according to an example embodiment.

More specifically, FIG. 4 shows an example of various text objects and graphical objects that are merged to create one or more graphical objects that are provided to a playback service, according to an example embodiment. As can be seen in FIG. 4, fourteen separate elements 1-14 are arranged in a z-axis and comprise an overall layout generated by layout control logic 150. Elements 1-6 on the z-axis, including both text and graphic objects, are merged to create a single graphic object 401. Video pane 402 and video pane 403 are defined as elements 5 and 6 on the z-axis. Elements 9, 10 on the z-axis are merged into graphic object 404, as are elements (graphic objects) 12-14 on the z-axis to create graphic object 406. Along with video pane 405 (element 11) a complete layout with elements 401, 402, 403, 404, 405, and 406 in the z-axis are provided to playback service 170.

Generally the merged graphical objects, e.g., 401, 404, 406 are sized and positioned at the bounds of the objects used to create them, but in cases where the playback service 170 has limitations with regards to arbitrary rendering of graphical objects (e.g., such objects must be placed on even-numbered pixels due to, e.g., the H.264 color-space compression) the graphical objects may be made larger. In such cases, even single graphical objects may be converted with expanded bounds to fit these limitations and/or to change their image format to reduce the number of object types the playback service 170 needs to support. In some implementations, layout control logic 150 may be configured to pad individual or combined images to the full bounds of the screen such that the images are rendered at an identical size and x/y position, simplifying the rendering required on the playback service 170.

Post-merger of the graphical and text objects, layout control logic 150 sends the merged graphic objects along with metadata describing their size and positioning alongside the size and positioning of the video panes, and any other metadata supported by the layout process (such as which participants video to assign to each video pane) either directly to the playback service 170 or to a server from which the playback service 170 can retrieve them. This transfer of data can be completed prior to a scheduled videoconference in which the data will be used, or live as changes are made. In one possible implementation, layout control logic 150 may be configured to provide a live preview stream for the host while those attending the event at VC sites 120 would see a prior-defined layout until the host chooses to switch to the new one. In cases of live changes, layout control logic 150 may be configured to only merge and send the graphical element(s) affected by the changes rather than resending all elements.

This dynamic pre-merger process means that the host can create layouts with hundreds or even thousands of graphics and text elements with any arbitrary font they choose, but the playback service needs only support rendering of video panes alongside N+1 graphical elements (e.g., PNG files), where N is the number of video panes. That is, as is shown in FIG. 4, three video panes are shown (thus N=3), and three graphic objects are shown as well. If the particular layout had been so arranged, one more (i.e., the N+1$^{th}$) merged graphic object could be disposed between video panes 402, 403 on the z-axis. In cases where layout control logic 150 does not support placing elements between video panes on the z-axis, then playback service 170 need be configured to render only two graphical elements (namely, background and foreground images).

In one possible implementation, layout control logic 150 can be configured to automatically crop graphical elements (after graphical rendering, for text objects) that would be located between video panes to remove any parts obscured by video panes above them on the z-axis and then promote them above all video panes on the z-axis before merging. This results in a number of graphical elements post-merger that is always limited to just two while still offering full design freedom. Note that this is only practical for opaque video panes. That is, if video panes can be configured to be semi-transparent then elements below them cannot be cropped. This optimization is shown in FIG. 5 as applied to the previous example of FIG. 4.

Figure 5:
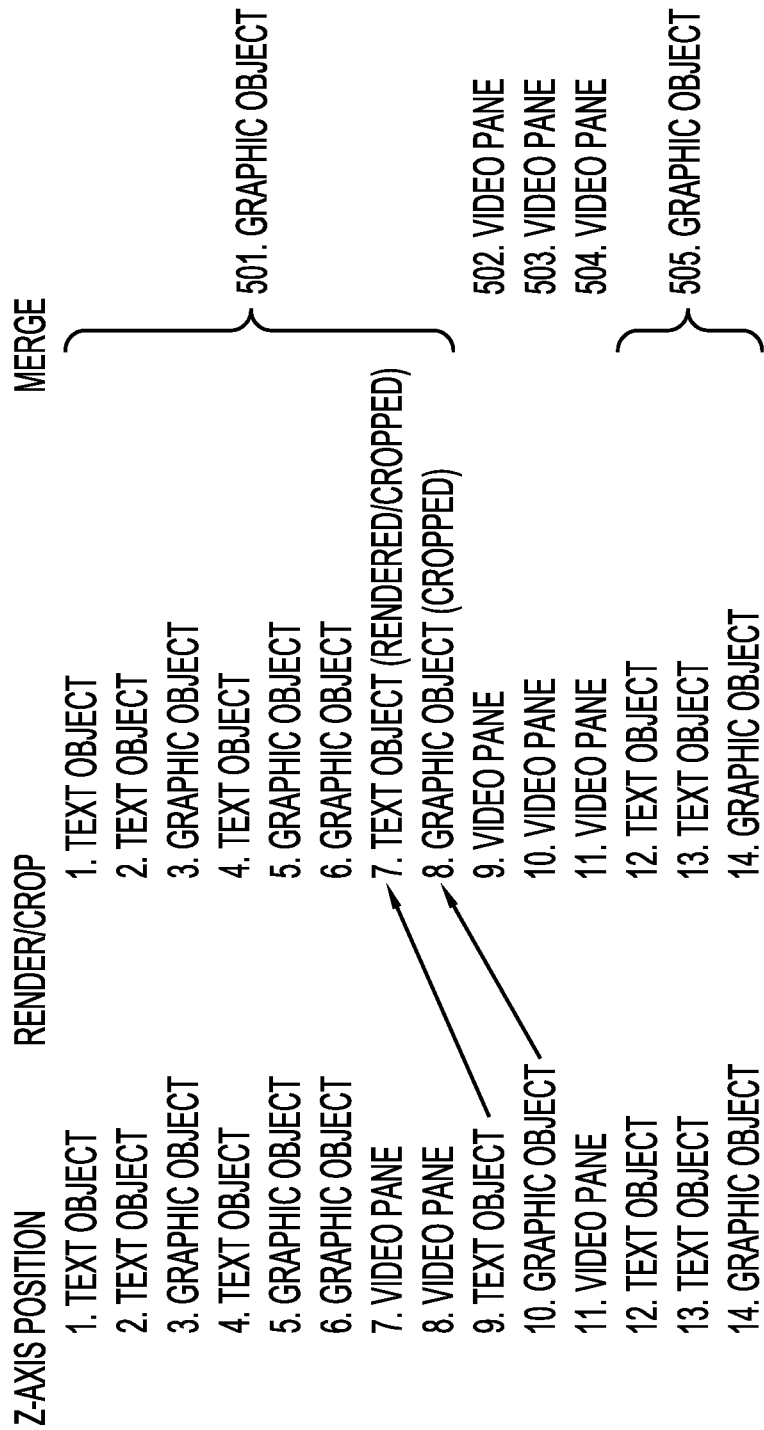
FIG. 5 shows another example of various text objects and graphical objects including some that are merged and/or cropped to create two graphical objects that are provided to a playback service, according to an example embodiment.

That is, FIG. 5 shows another example of various text objects and graphical objects including some that are merged and/or cropped to create two graphical objects that are provided to playback service 170, according to an example embodiment. In FIG. 5, element (text object) 9 on the z-axis and element (graphic object) 10 on the z-axis are moved up on the z-axis and also cropped (and also rendered first for the text object) so as to not interfere with the video panes 502, 503, 504 below. Upon rearrangement and merging by layout control logic 150, the full layout comprises graphic object 501 which includes merged text and graphics objects 1-7 on the z-axis, video panes 502, 503, 504, and graphic object 505 including text and graphic objects 12-14 on the z-axis. And, as noted above, only two graphic objects 501 and 505 (background and foreground) are delivered to playback service 170. Those skilled in the art will appreciate that automatic cropping should only be used in implementations where playback service 170 has sufficient accuracy of rendering to ensure that video panes and cropped elements can be placed without any gap or overlap between them.

The described approach provides several advantages.

For example, a host can employ an arbitrary number of graphical and textual elements while ensuring that a playback service need only ever render a bounded number of graphical elements in a single, predetermined format, usually just two (foreground and background), significantly reducing the complexity of the playback services and CPU consumption.

Layout control logic 150 as described herein also enables a host to use any arbitrary font they have access to while avoiding the need for separate playback service(s) to download and install fonts (which may have both security and copyright implications).

The operation of layout control logic 150 also reduces the number of elements that are provided to the playback service(s) to a smaller, bounded number, speeding up time to switch to a new layout and reducing the number of potential sources of error.

Layout control logic 150 further allows for very high accuracy of reproduction between what is previewed in the user interface 135 and what is rendered by the playback service 170 with regards to aspects such as sub-pixel accuracy of elements, even in playback services with very limited support for accurate positioning of graphical elements.

Layout control logic 150 also generally reduces the size of elements that are provided to playback service 170, both thanks to the automatic exclusion of any graphical areas that are occluded by those above them in the same layer, and the compression algorithms in modern graphical formats such as PNG. For example, a single image containing 25 elements will generally, be significantly smaller than the same 25 graphical elements as individual images, even with no overlap between images. When layout control logic 150 uses image-specific algorithms for non-trivial numbers of elements being merged, there will generally be notably better compression compared to using a generic compression algorithm, such as zipping those same individual elements.

Figure 6:
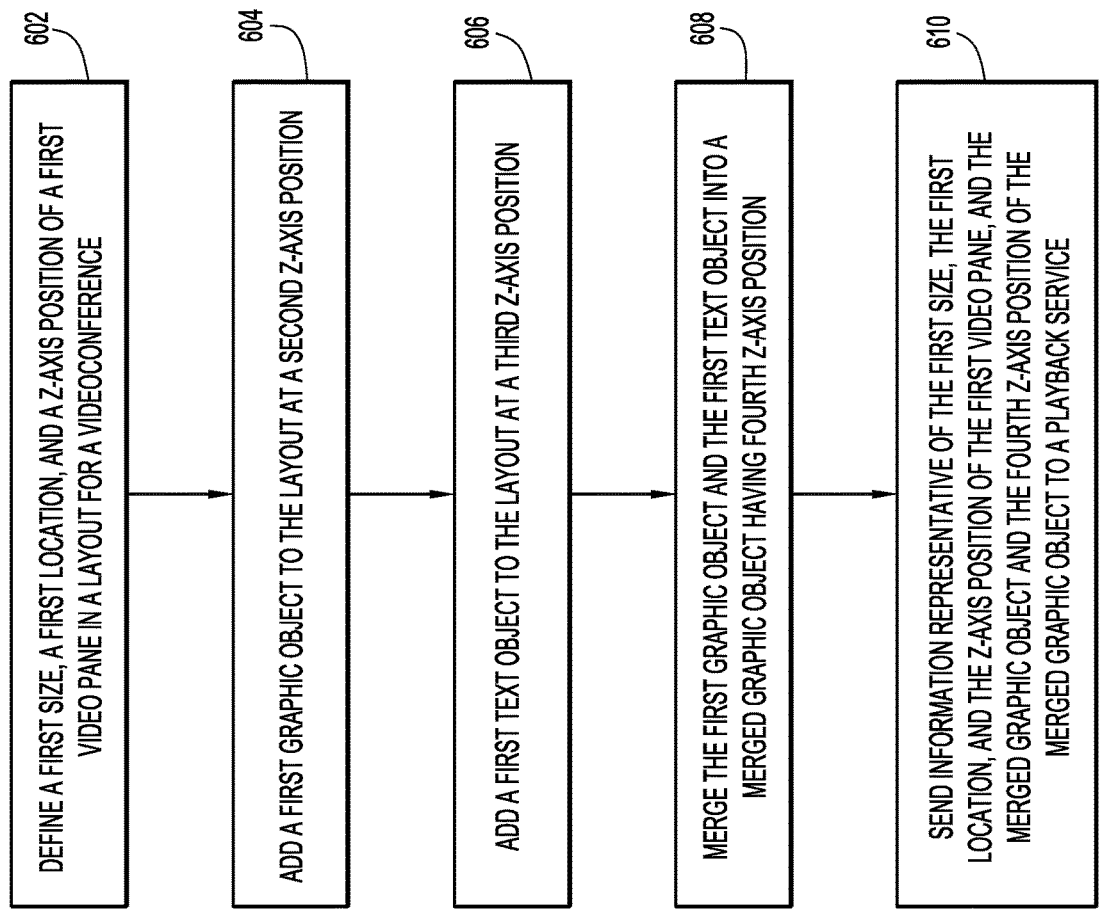
FIG. 6 is a flowchart showing a series of operations for creating a layout that is provided to a playback service, according to an example embodiment.

FIG. 6 is a flowchart showing a series of operations for creating a layout that is provided to a playback service, according to an example embodiment. The following operations may be performed by, e.g., layout control logic 150. At 602, an operation defines a first size, a first location, and a z-axis position of a first video pane in a layout for a videoconference. At 604, an operation adds a first graphic object to the layout at a second z-axis position. At 606, an operation adds a first text object to the layout at a third z-axis position. At 608, an operation merges the first graphic object and the first text object into a merged graphic object having fourth z-axis position. And, at 610, an operation sends information representative of the first size, the first location, and the z-axis position of the first video pane, and the merged graphic object and the fourth z-axis position of the merged graphic object to a playback service.

Those skilled in the art will appreciate that the embodiments described herein enable custom layouts to be designed by a host, using, e.g., a browser, and used in a meeting by separate endpoints and conferencing servers. Automatically rendering, cropping and merging graphical elements allows these display devices to render arbitrarily complex layouts with hundreds of graphics, text and font choices positioned with sub-pixel accuracy by just downloading and rendering a bounded number of images. In many cases, just two merged graphic objects are used one for the foreground and another for the background.

Figure 7:
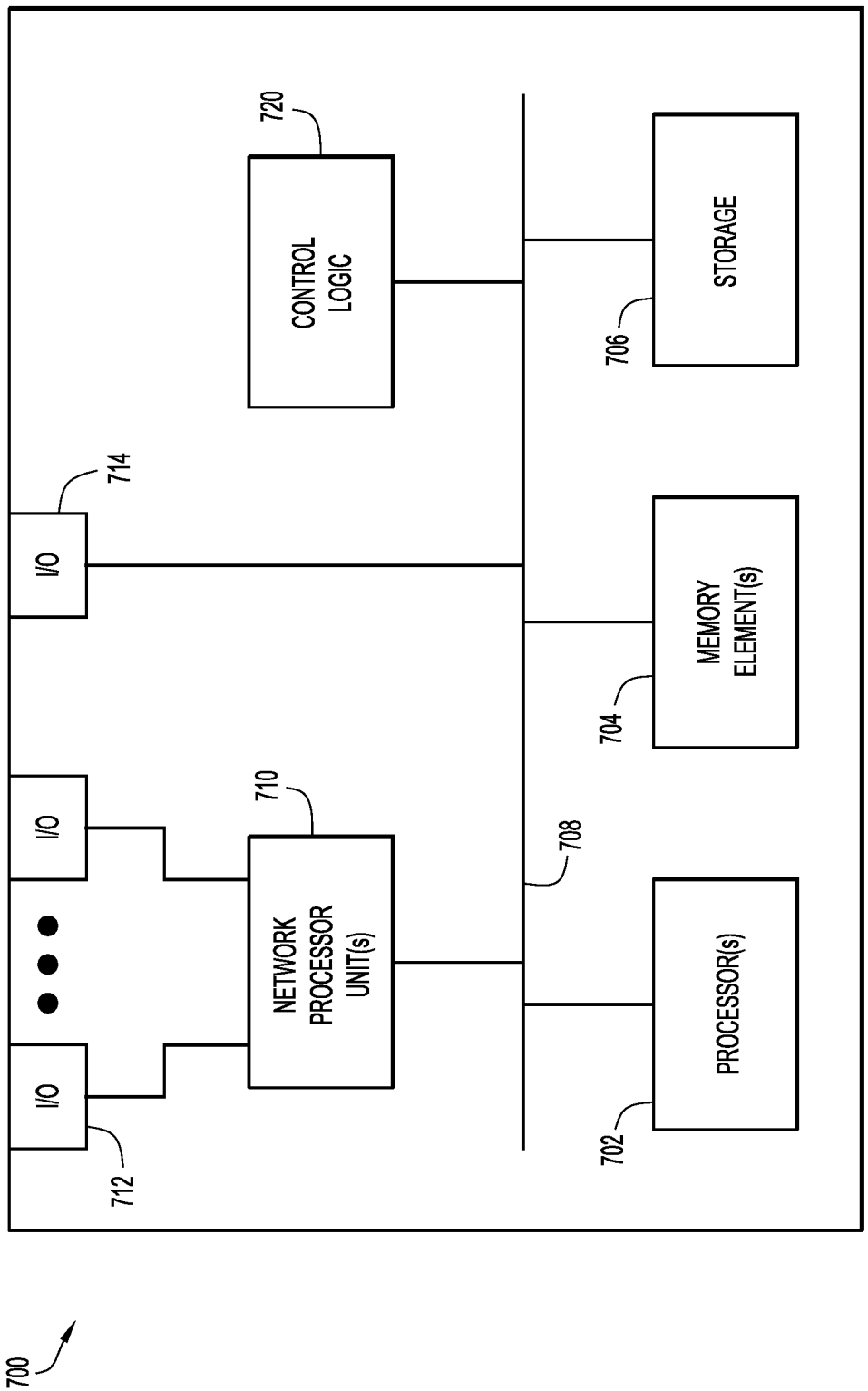
FIG. 7 illustrates a hardware block diagram of a computing device that may be configured to execute layout control logic, according to an example embodiment.

FIG. 7 illustrates a hardware block diagram of a computing device that may be configured to execute layout control logic, according to an example embodiment.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., layout control logic 150) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, and/or any other I/O port(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computer device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., layout control logic 150) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method is provided and includes defining a first size, a first location, and a z-axis position of a first video pane in a layout for a videoconference, adding a first graphic object to the layout at a second z-axis position, adding a first text object to the layout at a third z-axis position, merging the first graphic object and the first text object into a merged graphic object having a fourth z-axis position, and sending information representative of the first size, the first location, and the z-axis position of the first video pane, and the merged graphic object and the fourth z-axis position of the merged graphic object to a playback service.

In one embodiment, the arranging is performed by a design service that is separate and distinct from the playback service.

In an embodiment, the merged graphic object has a transparency characteristic.

The merged graphic object is a portable network graphic (PNG) file.

The method may be executed via a web browser.

In an embodiment, the method may include adding a second graphic object to the layout at a fifth z-axis position and a second text object to the layout at a sixth z-axis position, and merging the first graphic object, the first text object, the second graphic object, and the second text object into the merged graphic object and positioned at the fourth z-axis position. The fourth z-axis position may correspond to a background of the layout. The fourth z-axis position may correspond to a foreground of the layout.

The method may further include cropping the merged graphic object.

The method may also include defining a second size, a second location, and a z-axis position of a second video pane in the layout, and sending information representative of the second size, the second location, and the z-axis position of the second video pane to the playback service.

In another embodiment, a device is provided. The device includes an interface configured to enable network communications, a memory, and one or more processors coupled to the interface unit and the memory, and configured to: define a first size, a first location, and a z-axis position of a first video pane in a layout for a videoconference, add a first graphic object to the layout at a second z-axis position, add a first text object to the layout at a third z-axis position, merge the first graphic object and the first text object into a merged graphic object having a fourth z-axis position, and send information representative of the first size, the first location, and the z-axis position of the first video pane, and the merged graphic object and the fourth z-axis position of the merged graphic object to a playback service.

In an embodiment, the device may be separate and distinct from another device that executes the playback service.

In an embodiment, the merged graphic object may have a transparency characteristic.

The merged graphic object may be a portable network graphic (PNG) file.

In an embodiment, the one or more processors may be configured to add a second graphic object to the layout at a fifth z-axis position and a second text object to the layout at a sixth z-axis position, and merge the first graphic object, the first text object, the second graphic object, and the second text object into the merged graphic object and positioned at the fourth z-axis position.

The one or more processors may be further configured to crop the merged graphic object.

In still another embodiment, a non-transitory computer readable storage media encoded with instructions is provided. When executed by a processor, the instructions cause the processor to: define a first size, a first location, and a z-axis position of a first video pane in a layout for a videoconference, add a first graphic object to the layout at a second z-axis position, add a first text object to the layout at a third z-axis position, merge the first graphic object and the first text object into a merged graphic object having a fourth z-axis position, and send information representative of the first size, the first location, and the z-axis position of the first video pane, and the merged graphic object and the fourth z-axis position of the merged graphic object to a playback service.

In an embodiment, the merged graphic object may be a portable network graphic (PNG) file.

The instructions, when executed by a processor, may also cause the processor to add a second graphic object to the layout at a fifth z-axis position and a second text object to the layout at a sixth z-axis position, and merge the first graphic object, the first text object, the second graphic object, and the second text object into the merged graphic object and positioned at the fourth z-axis position.

The instructions, when executed by a processor, may also cause the processor to crop the merged graphic object.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    defining a first size, a first location, and a z-axis position of a first video pane in a layout for a videoconference;
    adding a first graphic object to the layout at a second z-axis position;
    adding a first text object to the layout at a third z-axis position;
    merging the first graphic object and the first text object into a single merged graphic object having a fourth z-axis position wherein the text object is rasterized to be merged into the single merged graphic object; and
    sending information representative of the first size, the first location, and the z-axis position of the first video pane, and the single merged graphic object and the fourth z-axis position of the single merged graphic object to a playback service,
    wherein the method is performed by an electronic processor executed on behalf of a design service.

2. The method of claim 1, wherein the method is performed by the design service that is separate and distinct from the playback service.

3. The method of claim 1, wherein the single merged graphic object has a transparency characteristic.

4. The method of claim 1, wherein the single merged graphic object is a portable network graphic (PNG) file.

5. The method of claim 1, further comprising executing the method via a web browser.

6. The method of claim 1, further comprising adding a second graphic object to the layout at a fifth z-axis position and a second text object to the layout at a sixth z-axis position, and merging the first graphic object, the first text object, the second graphic object, and the second text object into the single merged graphic object and positioned at the fourth z-axis position.

7. The method of claim 6, wherein the fourth z-axis position corresponds to a background of the layout.

8. The method of claim 1, wherein the fourth z-axis position corresponds to a foreground of the layout.

9. The method of claim 1, further comprising cropping the single merged graphic object.

10. The method of claim 1, further comprising defining a second size, a second location, and another z-axis position of a second video pane in the layout; and
sending information representative of the second size, the second location, and the another z-axis position of the second video pane to the playback service.

11. A device comprising:
an interface configured to enable network communications;
a memory; and
one or more processors coupled to the interface and the memory, and configured to:
define a first size, a first location, and a z-axis position of a first video pane in a layout for a videoconference;
add a first graphic object to the layout at a second z-axis position;
add a first text object to the layout at a third z-axis position;
merge the first graphic object and the first text object into a single merged graphic object having a fourth z-axis position wherein the text object is rasterized to be merged into the single merged graphic object; and
send information representative of the first size, the first location, and the z-axis position of the first video pane, and the single merged graphic object and the fourth z-axis position of the single merged graphic object to a playback service.

12. The device of claim 11, wherein the device is separate and distinct from another device that executes the playback service.

13. The device of claim 11, wherein the single merged graphic object has a transparency characteristic.

14. The device of claim 11, wherein the single merged graphic object is a portable network graphic (PNG) file.

15. The device of claim 11, wherein the one or more processors are further configured to add a second graphic object to the layout at a fifth z-axis position and a second text object to the layout at a sixth z-axis position, and merge the first graphic object, the first text object, the second graphic object, and the second text object into the single merged graphic object and positioned at the fourth z-axis position.

16. The device of claim 11, wherein the one or more processors are further configured to crop the single merged graphic object.

17. A non-transitory computer readable storage media encoded with instructions that, when executed by a processor, cause the processor to:
define a first size, a first location, and a z-axis position of a first video pane in a layout for a videoconference;
add a first graphic object to the layout at a second z-axis position;
add a first text object to the layout at a third z-axis position;
merge the first graphic object and the first text object into a single merged graphic object having a fourth z-axis position wherein the text object is rasterized to be merged into the single merged graphic object; and
send information representative of the first size, the first location, and the z-axis position of the first video pane, and the single merged graphic object and the fourth z-axis position of the single merged graphic object to a playback service.

18. The non-transitory computer readable storage media of claim 17, wherein the single merged graphic object is a portable network graphic (PNG) file.

19. The non-transitory computer readable storage media of claim 17, wherein the instructions, when executed by the processor, cause the processor to add a second graphic object to the layout at a fifth z-axis position and a second text object to the layout at a sixth z-axis position, and merge the first graphic object, the first text object, the second graphic object, and the second text object into the single merged graphic object and positioned at the fourth z-axis position.

20. The non-transitory computer readable storage media of claim 17, wherein the instructions, when executed by the processor, cause the processor to crop the merged graphic object.

\* \* \* \* \*